United States Patent
Jin et al.

(10) Patent No.: US 9,681,073 B1
(45) Date of Patent: Jun. 13, 2017

(54) METHOD AND APPARATUS FOR COMPENSATION OF VEILING GLARE IN AN IMAGE CAPTURING DEVICE

(71) Applicant: Marvell International Ltd., Hamilton (BM)

(72) Inventors: Elaine Jin, Fremont, CA (US); Samson Huang, Saratoga, CA (US)

(73) Assignee: Marvell International Ltd., Hamilton (BM)

(*) Notice: Subject to any disclaimer, the term of this patent is extended or adjusted under 35 U.S.C. 154(b) by 120 days.

(21) Appl. No.: 14/822,599

(22) Filed: Aug. 10, 2015

Related U.S. Application Data

(60) Provisional application No. 62/041,267, filed on Aug. 25, 2014.

(51) Int. Cl.
*H04N 5/357* (2011.01)
*H04N 17/00* (2006.01)

(52) U.S. Cl.
CPC .......... *H04N 5/357* (2013.01); *H04N 5/3572* (2013.01); *H04N 17/002* (2013.01)

(58) Field of Classification Search
None
See application file for complete search history.

(56) References Cited

U.S. PATENT DOCUMENTS

| | | | | |
|---|---|---|---|---|
| 5,423,312 A * | 6/1995 | Siegmund | ............. | A61B 1/042 385/133 |
| 5,748,768 A * | 5/1998 | Sivers | ................... | G06T 5/006 378/21 |
| 5,960,058 A * | 9/1999 | Baba | ........................ | G06T 5/50 378/4 |
| 2014/0313350 A1* | 10/2014 | Keelan | .................. | H04N 9/045 348/188 |

* cited by examiner

*Primary Examiner* — Shahbaz Nazrul

(57) ABSTRACT

Embodiments include an image capturing apparatus comprising: an image capturing module configured to capture (i) a first image of a first object, and (ii) a second image of a second object; a calibration module configured to, based on the first image of the first object, determine a correction factor; and an image processing module configured to, based on the correction factor, process the second image of the second object to compensate for veiling glare in the second image.

20 Claims, 4 Drawing Sheets

---

500

504 — During a calibration phase, (i) capture a first image of a first object, and (ii) based on the first image, determine one or more correction factors corresponding to one or more color channels 508 — During an operational phase, (i) capture a second image of a second object, and (ii) based on the one or more correction factors corresponding to the one or more color channels, process the second image to compensate for veiling glare in the second image

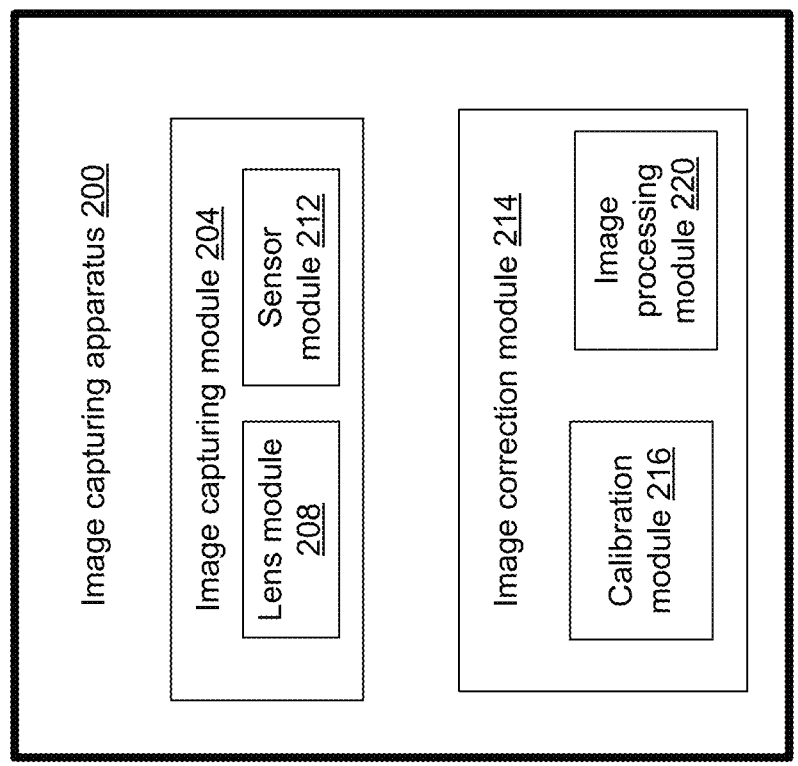

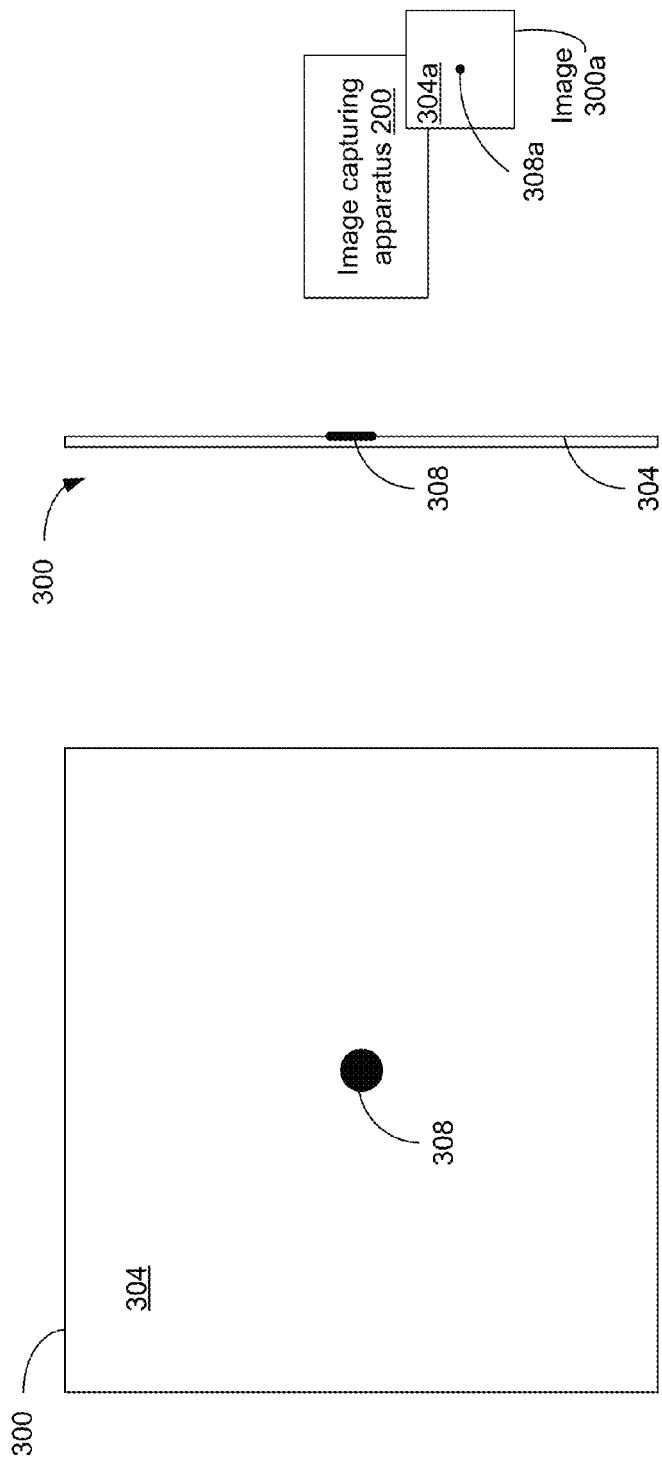
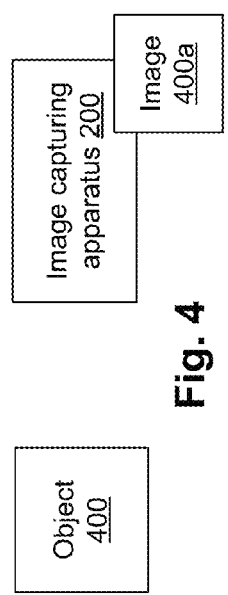

US 9,681,073 B1

METHOD AND APPARATUS FOR COMPENSATION OF VEILING GLARE IN AN IMAGE CAPTURING DEVICE

CROSS REFERENCE TO RELATED APPLICATIONS

This disclosure claims priority to U.S. Provisional Patent Application No. 62/041,267, filed on Aug. 25, 2014, which is incorporated herein by reference in its entirety.

TECHNICAL FIELD

Embodiments of the present disclosure relate to veiling glare in image capturing devices, and in particular to compensating for veiling glare in an image capturing device.

BACKGROUND

An image capturing system (e.g., a camera) often includes a lens element and other optical pathways through which light is reflected and passed, before reaching an image sensor. In an image capturing system, veiling glare (also sometimes referred to as "lens glare") refers to stray light in the lens element and the optical pathways, caused by reflections between surfaces of the lens element and an inside barrel of the lens element. Veiling glare, for example, results in image fogging (e.g., loss of shadow detail and color in the image), as well as ghost images, and can degrade image quality. Veiling glare often occurs in the presence of bright light sources in or near a field of view of the image capturing system. For example, when taking a picture facing the sun or near another strong light source, veiling glare can occur. FIG. 1 illustrates an image 100, in which veiling glare is prominent. In FIG. 1, light from the sun near the field of view of a camera generates veiling glare on the top-left side of a girl's head in the image 100. Veiling glare can be avoided if the sun light (or other bright light source) is away from the field of view of the image capturing system, although such avoidance may not always be possible.

In some cameras (e.g., relatively low end cameras that have a relatively low level of anti-reflective coating inside the lens barrel and the optical pathways), even without a strong light source in or near the field of view, veiling glare may occur.

SUMMARY

In various embodiments, the present disclosure provides an image capturing apparatus comprising: an image capturing module configured to capture (i) a first image of a first object, and (ii) a second image of a second object; a calibration module configured to, based on the first image of the first object, determine a correction factor; and an image processing module configured to, based on the correction factor, process the second image of the second object to compensate for veiling glare in the second image.

In various embodiments, the present disclosure also provides a method comprising: capturing (i) a first image of a first object, and (ii) a second image of a second object; based on the first image of the first object, determining a correction factor; and based on the correction factor, processing the second image of the second object to compensate for veiling glare in the second image.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

FIG. 2 schematically illustrates an image capturing apparatus configured to compensate for veiling glare in captured images according to one embodiment.

FIGS. 3A and 3B illustrate a calibration object according to one embodiment.

FIG. 4 schematically illustrates an image capturing apparatus capturing an image of an object during an operational phase of the image capturing apparatus according to one embodiment.

DETAILED DESCRIPTION

Figure 1:
FIG. 1 illustrates an example image in which veiling glare is prominent.

FIG. 2 schematically illustrates an image capturing apparatus 200 (henceforth referred to as "apparatus 200") configured to compensate for veiling glare in captured images. The apparatus 200, for example, represents an electronic device that can capture images of various objects. For example, the apparatus 200 can be a camera, a cell phone, a web cam, a laptop, a video camera, a smart phone, or the like.

In an embodiment, the apparatus 200 comprises an image capturing module 204 comprising components that are used to capture an image. For example, the image capturing module 204 comprises a lens module 208, a sensor module 212, and/or the like. The lens module 208 (e.g., comprising an optical lens element), for example, is configured to appropriately route light from an object (e.g., whose image is to be captured by the apparatus 200) to the sensor module 212. The sensor module 212 comprises an array of sensors to capture the image of the object. The image capturing module 204 may comprise various other components (e.g., color filters, a shutter mechanism to control exposure of light to the sensor module 212, etc.) to capture images.

In an example, due to stray light in various components of the image capturing module 204 (e.g., caused by reflections between surfaces of a lens element and an inside barrel of the lens element included within the image capturing module 204), veiling glare may form in images captured by the apparatus 200. Such veiling glare, for example, results in image fogging (e.g., loss of shadow detail and color in the image), as well as ghost images, and can degrade image quality.

In an embodiment, the apparatus 200 comprises an image correction module 214 configured to compensate for veiling glare in images captured by the apparatus 200. In an example, in addition to compensating veiling glare, the image correction module 214 may also compensate for various other image issues in the captured images (e.g., perform white balance (WB) correction, lens shading correction (LSC), etc.).

In an embodiment, the veiling glare correction module 214 comprises a calibration module 216 and an image processing module 220. As will be discussed in further detail herein later, in an embodiment, during a calibration phase, while the apparatus 200 captures an image of a pre-determined calibration object, the calibration module 216 determines one or more correction factors associated with veiling glare in the image of the calibration object. The calibration module 216 transmits the one or more correction factors to the image processing module 220. In an embodiment, during an operational phase of the apparatus 200, while the apparatus 200 captures an image of an object (e.g., other than the calibration object), the image processing module 220 corrects the image of the object based on the one or more correction factors, e.g., to compensate for veiling glare in the image of the object.

FIGS. 3A and 3B schematically illustrate a calibration object 300 (henceforth referred to as "object 300"), in accordance with an embodiment. Specifically, FIG. 3A illustrates a front view of the object 300, and FIG. 3B illustrates a side view of the object 300.

In an embodiment, the object 300 comprises a first section 304 that is substantially white, and a second section 308 that is substantially black. In an embodiment, because the section 308 is substantially black, no light (or very little light) is reflected from the section 308.

In an example, the object 300 comprising the sections 304 and 308 can be formed by any appropriate manner. As an example, the object 300 is a white board, with a black area in the white board, where the white board and the black area respectively represent the sections 304 and 308 of FIGS. 3A and 3B. In an example, the black area is generated by drawing the black area in the white board with a black pen. In another example, a small black paper or black fabric is pasted over the white board. In yet another example, the white board has a small hole in it, and a black cloth is placed behind the hole. In another example, the white board has a small hole in it, and a box with a black cloth is placed behind the hole (e.g., so that very less or no light is reflected form the hole) to form the black area. In an example, the white board is made of white paper, white fabric, white paint, a white box, and/or the like.

In an example, in the object 300, the section 308 is placed substantially in a center area of the section 304. In another example, the section 308 is placed at any location within the section 304. The section 304 in FIG. 3A has a rectangular shape, although the section 304 can have any other appropriate shape. The section 308, for example, is small (e.g., compared to the section 304). For example, the section 308 is less than 1 centimeter. In FIG. 3A, the section 308 has a circular shape, although the section 308 can have another appropriate shape, e.g., a rectangle, a square, etc.

As illustrated in FIG. 3B, the apparatus 200 is placed in front of the object 300. For example, the apparatus 200 is placed and configured such that a field of view of the apparatus 200 comprises the object 300. For example, the field of view of the apparatus 200 is adjusted such that the field of view of the apparatus 200 does not cover anything external to the object 300. The field of view of the apparatus 200 may not necessarily cover the entirety of the section 304, but the field of view of the apparatus 200 covers (i) at least a portion of the section 304 and (ii) an entirety of the section 308. The field of view of the apparatus 200 is adjusted, for example, by controlling the distance of the apparatus from the object 300 and/or by adjusting a "zoom" feature of the apparatus 200.

In an embodiment, once the field of view of the apparatus 200 is adjusted, as discussed above, the apparatus 200 is configured to capture an image of the object 200. The image of the object 200 is, for example, captured during a calibration phase of the apparatus 200. In an example, the image of the object 300, as captured by the apparatus 200 during the calibration phase of the apparatus 200, is referred to as image 300a, as illustrated in FIG. 3B. The image 300a has (i) a section 304a that corresponds to at least a part of the section 304 of the object 300, and (ii) a section 308a that corresponds to the section 308 of the object 300.

As the section 308 is substantially black, ideally, the section 308a should not have any brightness in the image 300a (e.g., assuming appropriate black level correction is performed on the image 300a). That is, if the apparatus 200 does not produce any veiling glare, the section 308a should not have any brightness in the image 300a.

However, if the apparatus 200 produces veiling glare, such veiling glare can cause non-zero brightness in the section 308a in the image 300a. An amount of veiling glare in the image 300a, for example, is based on the characteristics of the apparatus 200 (e.g., based on the characteristics and quality of an anti-reflective coating inside the barrel of the lens element in the apparatus, the characteristics and quality of the lens element, etc). A relatively low level of veiling glare is usually acceptable. However, if the veiling glare is relatively high (e.g., higher than a threshold value), such veiling glare may need to be compensated.

The image 300a comprises a plurality of pixels, some associated with the section 304a and the remaining associated with the section 308a. In an embodiment, assume that an average green channel value of the pixels of the section 304a is G_Avg_White. That is, G_Avg_White represents an average of the green channel values of all the pixels of the section 304a. It is to be noted that in an example, due to lens shading effect, a center part of the section 304a may appear to be relatively brighter than the peripheral and corners of the section 304a in the image 300a. Accordingly, determining the average of the green channel values of all the pixels of the section 304a reduces the impact of the lens shading effect.

In an embodiment, assume that an average green channel value of the pixels of the section 308a in the image 300a is G_hole. As discussed above, as the section 308 is substantially black, ideally (e.g., without any veiling glare), the section 308a should not have any brightness in the image 300a, and G_hole should ideally be zero. However, due to veiling glare, the average green channel value G_hole of the pixels of the section 308a may have a non-zero value.

As an example, assume that 8 bits are used to represent green channel values of individual pixels of the image 300a. Then, for example, the G_Avg_White is equal to, or near 255. The G_hole is almost zero if the apparatus 200 does not produce any veiling glare. In presence of veiling glare, the G_hole has a value of, for example, 10, 20, or the like.

A veiling glare ratio for the green color channel is determined as follows:

$$VG\_ratio = G\_hole / G\_Avg\_White. \qquad \text{Equation 1}$$

The veiling glare ratio for the green color channel (i.e., VG_ratio) represents a level of veiling glare for the green color channel produced by the apparatus 200. In an example, if VG_ratio is relatively low (e.g., less than a threshold value, where the threshold value is, for example, 2%), no compensation for veiling glare is desired or performed in the apparatus 200. However, if VG_ratio is relatively high (e.g., higher than the threshold value), compensation for veiling glare is performed, as discussed below.

It is to be noted that while capturing the image 300a of the object 300, an appropriate lighting arrangement can be used. In an example, the light source level of the lighting arrangement may affect each of the parameters G_hole and G_Avg_White, but the veiling glare ratio for the green color channel VG_ratio is substantially independent of the light source level of the lighting arrangement.

In an embodiment, the lens element of the lens module 208 and various other components in an optical pathway of the apparatus 200 have anti-reflection coatings. In an example, the anti-reflection coatings usually have stronger reflection for red and blue color channels, compared to that for the green color channel. Accordingly, in an example, veiling glare for the red and blue color channel is higher, compared to that for the green color channel.

In an embodiment, similar to the veiling glare ratio for the green color channel of equation 1, veiling glare ratios for the red color channel and the blue color channel are determined. For example, to determine the veiling glare ratio for the red color channel (e.g., VR_ratio), a corresponding R_Avg_White (e.g., which represents an average red channel value of the pixels of the section 304a) and R_hole (e.g., which represents an average red channel value of the pixels of the section 308a) are determined, and the VR_ratio is based on the ratio of R_hole and R_Avg_White. In another example, the veiling glare ratio for the blue color channel (e.g., VB_ratio) is similarly determined.

In another embodiment, instead of determining the veiling glare ratio for the red color channel (e.g., VR_ratio) from R_Avg_White and R_hole, the veiling glare for the red color channel is estimated from the veiling glare for the green color channel, as discussed in more detail herein later. Such estimation, for example, is relatively less computationally intensive (e.g., compared to computation required to determine VR_ratio from R_Avg_White and R_hole). Similar estimation is performed for the blue color channel as well.

For example, assume a red channel veiling glare gain is given by R_AR_gain, and a blue channel veiling glare gain is given by B_AR_gain, which are determined as follows:

$$R\_AR\_gain = VR\_ratio / VG\_ratio, \quad \text{Equation 2}$$

$$B\_AR\_gain = VB\_ratio / VG\_ratio, \quad \text{Equation 3}$$

where VR_ratio=R_hole/R_Avg_White, where VB_ratio=B_hole/B_Avg_White, and where VG_ratio is determined based on equation 1.

In another embodiment, instead of determining R_AR_gain and B_AR_gain based on equations 2 and 3, these factors are assigned the following values:

$$R\_AR\_gain = 1.05 \sim 1.1, \quad \text{Equation 4}$$

$$B\_AR\_gain = 1.05 \sim 1.1, \quad \text{Equation 5}$$

That is, each of R_AR_gain and B_AR_gain is assigned a value that is slightly greater than 1, e.g., assigned a value in the range of 1.05 to 1.1 (although values slightly outside this range may also be assigned). As discussed herein earlier, the anti-reflection coatings in the apparatus 200 usually have stronger reflection for red and blue color channels, compared to that for the green color channel. Accordingly, R_hole and B_hole may be slightly higher than G_hole. Hence, each of R_AR_gain and B_AR_gain is assigned a value that is slightly greater than 1.

It is to be noted that the VG_ratio, R_AR_gain and B_AR_gain are determined (e.g., by the calibration module 216), based on the apparatus capturing the image 300a of the object 300 during a calibration phase. In an embodiment, subsequent to the calibration phase, the calibration module 216 transmits the respective values of the VG_ratio, R_AR_gain and B_AR_gain to the image processing module 220. During an operational phase, the apparatus (e.g., the image processing module 220) uses the VG_ratio, R_AR_gain and B_AR_gain to compensate for veiling glare in captured images. The VG_ratio, R_AR_gain and B_AR_gain are also referred to herein as correction factors corresponding to the green, red and blue color channels, respectively.

FIG. 4 schematically illustrates the apparatus 200 capturing an image 400a of an object 400 during the operational phase of the apparatus 200. The object 400 can be any appropriate object (e.g., a person, a scenery, or the like), an image of which is captured by the apparatus 200. In an example, the object 400 is different from the calibration object 300 of FIGS. 3A and 3B. In an example, a veiling glare in the image 400a is compensated (e.g., by the image processing module 220), as discussed in detail herein below.

Upon capturing the image 400a, an average green color channel value G_Avg_Img of all the pixels of the image 400a is determined. For example, each pixel of the image 400 has a corresponding green color channel value, and G_Avg_Img represents the average of the green color channel values of all the pixels of the image 400a. Subsequently, a green color channel veiling glare correction value VG_value is determined as follows:

$$VG\_value = VG\_ratio \times G\_Avg\_Img, \quad \text{Equation 6,}$$

where VG_ratio is determined based on equation 1.

In an embodiment, a red color channel veiling glare correction value VR_value and a blue color channel veiling glare correction value VB_value are determined as follows:

$$VR\_value = VG\_value \times R\_AR\_gain. \quad \text{Equation 7,}$$

$$VB\_value = VG\_value \times B\_AR\_gain. \quad \text{Equation 8,}$$

where VG_value is determined from equation 6, and R_AR_gain and B_AR_gain are determined either from equations 2-3 or equations 4-5.

Equations 7 and 8 determine the VR_value and the VB_value, based on the R_AR_gain and the B_AR_gain, respectively. However, in another embodiment, the VR_value and the VB_value are determined directly from VR_ratio and VB_ratio, respectively (e.g., similar to equation 6), where the VR_ratio and VB_ratio are determined similar to the determination of VG_ratio, e.g., as discussed above with respect to equation 1.

In an embodiment, the green color channel veiling glare correction value VG_value is subtracted from the green color channel values of individual pixels of the image 400a, to compensate for veiling glare in the green color channel. In an embodiment, compensation for the veiling glare for the red and blue color channels are performed in a similar manner. For example, the red color channel veiling glare correction value VR_value is subtracted from the red color channel values of individual pixels of the image 400a, to compensate for veiling glare in the red color channel; and the blue color channel veiling glare correction value VB_value is subtracted from the blue color channel values of individual pixels of the image 400a, to compensate for veiling glare in the blue color channel.

For example, the image 400a includes a plurality of pixels, including at least a first pixel with a green color channel value of G1, a red color channel value of R1, and a blue color channel value of B1. Then, a compensated green color channel value G1' (e.g., compensated for veiling glare in the green color channel of the first pixel), a compensated red color channel value R1', and a compensated blue color channel value B1' for the first pixel are determined as:

$$G1' = G1 - VG\_value, \quad \text{Equation 9}$$

$$R1' = R1 - VR\_value, \quad \text{Equation 10}$$

$$B1' = B1 - VB\_value. \quad \text{Equation 11}$$

In a similar manner, the green, red and blue color channel values of the other pixels of the image 400a are also compensated, to compensate for the veiling glare in the image 400a.

In an embodiment, the image processing module 220 compensates for veiling glare, in accordance with equations 9-11, prior to the image processing module 220 implementing any possible lens shading correction (LSC). For example, the veiling glare correction is performed prior to any lens shading correction, as lens shading correction can introduce spatial-variance amplification.

In an embodiment, the image processing module 220 compensates for veiling glare, in accordance with equations 9-11, prior to the image processing module 220 implementing any possible white balance (WB) correction. In an example, in a scenario in which compensation for veiling glare is performed after performing the white balance correction, then the white balance gains is reversed for red and blue color channel veiling glare corrections. For example, if the white balance gains are R_WB_gain and B_WB_gain, respectively, for the red and blue color channels, then the red color channel veiling glare correction value VR_value and the blue color channel veiling glare correction value VB_value are determined as follows:

$$VR\_value = VG\_value \times R\_AR\_gain / R\_WB\_gain, \quad \text{Equation 12}$$

$$VB\_value = VG\_value \times B\_AR\_gain / B\_WB\_gain. \quad \text{Equation 13}$$

That is, if compensation for veiling glare is performed subsequent to performing the white balance correction, then equations 12 and 13 are used, instead of equations 7 and 8, to determine VR_value and VB_value. In such a scenario, the VR_value and VB_value, as determined in equations 12 and 13, are used in equations 10 and 11 for veiling glare compensation for the red and blue color channels.

Correction of veiling glare, as discussed with above, is implemented for one or more images captured by the apparatus 200 (e.g., implemented for the image 400a). In an embodiment, correction of veiling glare can be implemented for a series of images captured by the apparatus 200, e.g., implemented to individual image frames of a video captured by the apparatus 200.

In an example, in a series of image frames of a video, one portion of the scene can oscillate or change brightness, while the rest of the scene remains at substantially the same brightness. For example, in three image frames in the video (e.g., which are temporally close to each other), a section of the image frames can have varied brightness (e.g., the brightness may oscillate), while another section of the image frames can have substantially similar brightness. Since the veiling glare correction value of a color channel is proportional to the average brightness of the scene (e.g., VG_value=VG_ratio×G_Avg_Img, as discussed above, where G_Avg_Img is representative of the average brightness of the scene in the green color channel), the oscillating section will cause the average brightness to oscillate, and thus cause the veiling glare correction value to oscillate.

In an embodiment, to avoid such oscillation of the veiling glare correction value, the image processing module 220 comprises a brightness oscillation detection module (not illustrated in FIG. 2). In an embodiment, the brightness oscillation detection module monitors the brightness of the image frames of the video. If the brightness oscillation detection module detects an oscillation of brightness in the image frames (e.g., detects an oscillation of brightness in a portion of the image frames, or detects an oscillation of average brightness of consecutive image frames), an average brightness over time is used for veiling glare correction. For example, in such a scenario, the G_Avg_Img of equation 6 represents the average green color channel value G_Avg_Img of the pixels of multiple image frames of the video.

Figure 5:
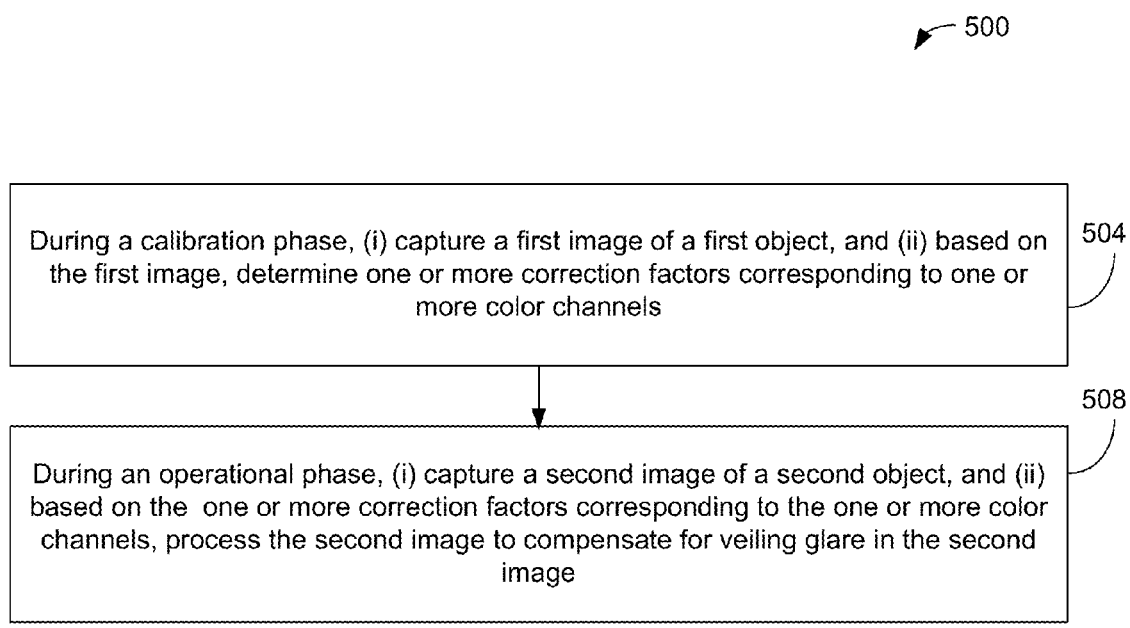
FIG. 5 illustrates a flow diagram of a method for compensating for veiling glare in images captured by an image capturing apparatus according to one embodiment.

FIG. 5 illustrates a flow diagram 500 of an example method for compensating for veiling glare in images captured by an image capturing apparatus (e.g., the apparatus 200). At 504, during a calibration phase, a first image (e.g., image 300a) of a first object (e.g., the calibration object 300) is captured (e.g., by the image capturing module 204). Also at 504, based on the first image, one or more correction factors (e.g., the VG_ratio, R_AR_gain and B_AR_gain) corresponding to one or more color channels are determined (e.g., by the calibration module 216), e.g., as discussed with respect to equations 1-5.

At 508, during an operational phase, a second image (e.g., the image 400) of a second object (e.g., the object 400) is captured (e.g., by the image capturing module 204). Also at 508, based on the one or more correction factors corresponding to the one or more color channels, the second image is processed (e.g., by the image processing module 220) to compensate for veiling glare in the second image, e.g., as discussed with respect to equations 6-11.

The description may use the phrases "in an embodiment," or "in embodiments," which may each refer to one or more of the same or different embodiments. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. An image capturing apparatus comprising:
   an image capturing module configured to capture (i) a first image of a first object, and (ii) a second image of a second object;
   a calibration module configured to, based on the first image of the first object, determine a correction factor; and
   an image processing module configured to, based on the correction factor, process the second image of the second object to compensate for veiling glare in the second image.

2. The image capturing apparatus of claim 1, wherein the correction factor is a first correction factor associated with a first color channel, wherein the first image comprises (i) a first section comprising a first plurality of pixels and (ii) a second section comprising a second plurality of pixels, and wherein the calibration module is configured to determine the first correction factor by:
   determining a first average of pixel values of the first color channel of the first plurality of pixels;
   determining a second average of pixel values of the first color channel of the second plurality of pixels; and based on a ratio of the first average and the second average, determining the first correction factor.

3. The image capturing apparatus of claim 2, wherein the first section is substantially black in color and the second section is substantially white in color.

4. The image capturing apparatus of claim 1, wherein the correction factor is a first correction factor associated with a first color channel, wherein the second image comprises a plurality of pixels, and wherein the image processing module is configured to process the second image of the second object by:
   determining a first average of pixel values of the first color channel of the plurality of pixels of the second image; and
   based on a product of (i) the first average of pixel values of the first color channel of the plurality of pixels of the second image and (ii) the first correction factor, processing the second image.

5. The image capturing apparatus of claim 4, wherein the image processing module is configured to process the second image of the second object by:
   based on the product of (i) the first average of pixel values of the first color channel of the plurality of pixels of the second image and (ii) the first correction factor, determining a first veiling glare correction value for the first color channel; and
   processing the second image by subtracting, from a pixel value of the first color channel for a first pixel of the plurality of pixels of the second image, the first veiling glare correction value.

6. The image capturing apparatus of claim 1, wherein:
   the correction factor is a first correction factor associated with a first color channel;
   the calibration module is further configured to, based on the first image of the first object, determine a second correction factor associated with a second color channel; and
   the image processing module is configured to process the second image of the second object based on the second correction factor.

7. The image capturing apparatus of claim 6, wherein the calibration module is configured to determine the second correction factor associated with the second color channel by:
   multiplying the first correction factor by a multiplication factor, wherein the multiplication factor is greater than one.

8. The image capturing apparatus of claim 7, wherein the second image comprises a plurality of pixels, and wherein the image processing module is further configured to process the second image of the second object by:
   determining a first average of pixel values of the first color channel of the plurality of pixels of the second image;
   based on a product of (i) the first average of pixel values of the first color channel of the plurality of pixels of the second image and (ii) the second correction factor associated with the second color channel, determining a veiling glare correction value for the second color channel; and
   based on the veiling glare correction value for the second color channel, processing the second image.

9. The image capturing apparatus of claim 7, wherein the first color channel comprises a green color channel, and wherein the second color channel comprises one of a blue color channel or a red color channel.

10. The image capturing apparatus of claim 1, wherein the second image is included in a series of images of a video, wherein the correction factor is a first correction factor associated with a first color channel, and wherein the image processing module is configured to process the second image of the second object by:
    determining a first average of pixel values of the first color channel of pixels of two or more images of the series of images, wherein the two or more images include the second image; and
    based on a product of (i) the first average of pixel values and (ii) the first correction factor, processing the second image.

11. A method comprising:
    capturing (i) a first image of a first object, and (ii) a second image of a second object;
    based on the first image of the first object, determining a correction factor; and
    based on the correction factor, processing the second image of the second object to compensate for veiling glare in the second image.

12. The method of claim 11, wherein the correction factor is a first correction factor associated with a first color channel, wherein the first image comprises (i) a first section comprising a first plurality of pixels and (ii) a second section comprising a second plurality of pixels, and wherein determining the first correction factor comprises:
    determining a first average of pixel values of the first color channel of the first plurality of pixels;
    determining a second average of pixel values of the first color channel of the second plurality of pixels; and
    based on a ratio of the first average and the second average, determining the first correction factor.

13. The method of claim 12, wherein the first section is substantially black in color and the second section is substantially white in color.

14. The method of claim 11, wherein the correction factor is a first correction factor associated with a first color channel, wherein the second image comprises a plurality of pixels, and wherein processing the second image of the second object comprises:
    determining a first average of pixel values of the first color channel of the plurality of pixels of the second image; and
    based on a product of (i) the first average of pixel values of the first color channel of the plurality of pixels of the second image and (ii) the first correction factor, processing the second image.

15. The method of claim 14, wherein processing the second image of the second object further comprises:
    based on the product of (i) the first average of pixel values of the first color channel of the plurality of pixels of the second image and (ii) the first correction factor, determining a first veiling glare correction value for the first color channel; and
    processing the second image by subtracting, from a pixel value of the first color channel for a first pixel of the plurality of pixels of the second image, the first veiling glare correction value.

16. The method of claim 11, wherein the correction factor is a first correction factor associated with a first color channel, and wherein the method further comprises:
    based on the first image of the first object, determining a second correction factor associated with a second color channel,
    wherein processing the second image of the second object comprises
       based on the second correction factor, processing the second image of the second object.

17. The method of claim 16, wherein determining the second correction factor associated with the second color channel comprises:
  determining the second correction factor by multiplying the first correction factor by a multiplication factor, wherein the multiplication factor is greater than one.

18. The method of claim 17, wherein the second image comprises a plurality of pixels, and wherein processing the second image of the second object comprises:
  determining a first average of pixel values of the first color channel of the plurality of pixels of the second image;
  based on a product of (i) the first average of pixel values of the first color channel of the plurality of pixels of the second image and (ii) the second correction factor associated with the second color channel, determining a veiling glare correction value for the second color channel; and
  based on the veiling glare correction value for the second color channel, processing the second image.

19. The method of claim 17, wherein the first color channel comprises a green color channel, and wherein the second color channel comprises one of a blue color channel or a red color channel.

20. The method of claim 11, wherein the second image is included in a series of images of a video, wherein the correction factor is a first correction factor associated with a first color channel, and wherein processing the second image of the second object comprises:
  determining a first average of pixel values of the first color channel of pixels of two or more images of the series of images, wherein the two or more images include the second image; and
  based on a product of (i) the first average of pixel values and (ii) the first correction factor, processing the second image.

* * * * *